United States Patent [19]
Hanser et al.

[11] Patent Number: 5,772,270
[45] Date of Patent: Jun. 30, 1998

[54] PIVOTAL EXTENSION APPARATUS FOR MOTOR HOMES AND RECREATIONAL VEHICLES

[75] Inventors: Paul E. Hanser, Tipton; Stacy M. Hanser, Davenport, both of Iowa; Jeffrey W. Hogue, East Moline, Ill.

[73] Assignee: HWH Corporation, Moscow, Iowa

[21] Appl. No.: 511,477

[22] Filed: Aug. 4, 1995

[51] Int. Cl.⁶ .................................................. B60P 3/34
[52] U.S. Cl. ........................... 296/26; 296/175; 296/176; 52/69
[58] Field of Search ............................ 296/26, 171, 172, 296/175, 176; 52/64, 69

[56] References Cited

U.S. PATENT DOCUMENTS

| | | | |
|---|---|---|---|
| 3,397,006 | 8/1968 | Grant | 296/26 |
| 5,078,442 | 1/1992 | Rau et al. | 296/26 |
| 5,131,712 | 7/1992 | Heinz | 296/100 |
| 5,570,924 | 11/1996 | Few et al. | 296/26 X |

*Primary Examiner*—Joseph D. Pape
*Attorney, Agent, or Firm*—Henderson & Sturm

[57] ABSTRACT

An apparatus for extending and retracting one structure with respect to another which utilizes a pivoting mechanism rather than the standard linear mechanisms known in the art. The mechanism further utilizes a torsion bar connected between the distal ends of the actuator for synchronizing the movement of the actuators to prevent binding and twisting. A first embodiment utilizes a flat chain and a pair of circular guides to maintain the torsion bar in a horizontal plane, while a second embodiment of the invention utilizes a four-bar linkage system.

8 Claims, 5 Drawing Sheets

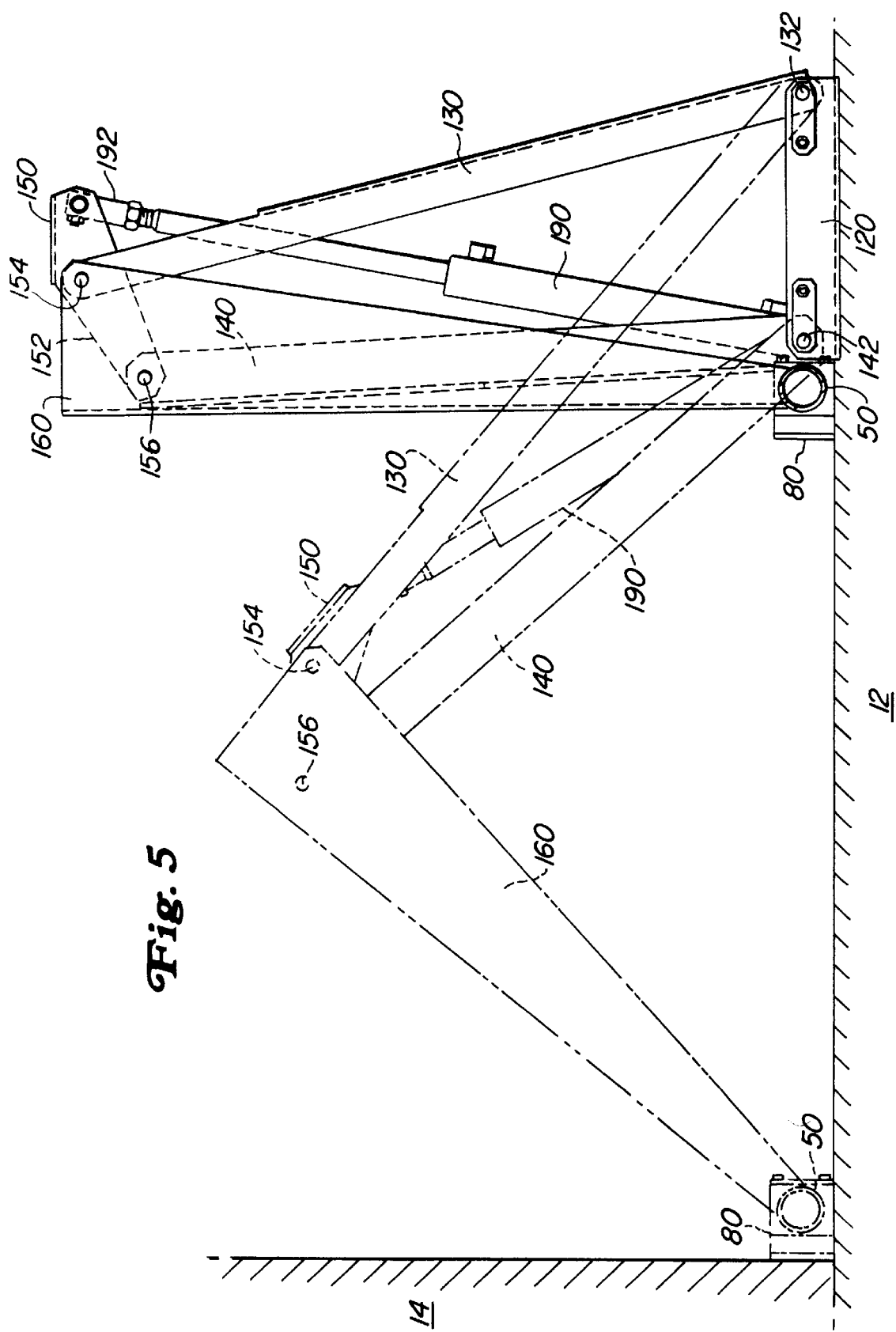

PIVOTAL EXTENSION APPARATUS FOR MOTOR HOMES AND RECREATIONAL VEHICLES

TECHNICAL FIELD

This invention relates to extension mechanisms for extendable rooms for motor homes and recreational vehicles.

BACKGROUND ART

Linear and pivotal actuators, whether hydraulic, pneumatic, or electric, are used for a multitude of actions involving moving one structure relative to another. These actuators are most often used in pairs due to the size of the structure to be moved, or due to the instability of the structure. However, using a pair of actuators often causes problems due to the inherent difficulty in moving the actuators precisely together. If one actuator moves slightly before the other, or if one actuator moves slightly faster than the other, binding and twisting can occur in the structure being moved.

In the room extending mechanisms for mobile homes and recreational vehicles which are known in the art, the actuators slide a moveable structure, as perhaps a small living area, in a horizontal plane. Binding is a common problem when one actuator leads or lags the other. The standard remedy is to reverse the actuators for a moment in hopes of relieving the binding.

DISCLOSURE OF THE INVENTION

The present invention teaches an apparatus for extending and retracting one structure with respect to another which utilizes a pivoting mechanism rather than the standard linear mechanisms known in the art. The mechanism further utilizes a torsion bar connected between the distal ends of the actuator for synchronizing the movement of the actuators to prevent binding and twisting. A first embodiment utilizes a flat chain and a pair of circular guides to maintain the torsion bar in a horizontal plane, while a second embodiment of the invention utilizes a four-bar linkage system.

An object of the present invention is to provide a room extension apparatus for mobile homes and recreational vehicles which prevents binding during extension and retraction.

A further object of the present invention is to provide a room extension apparatus which is able to maintain movement of both actuators in a common, horizontal plane.

BRIEF DESCRIPTION OF THE DRAWINGS

These and other attributes of the invention will become more clear upon a thorough review of the best mode for carrying out the invention, particularly when reviewed in conjunction with the drawings, wherein

FIG. 5 is a side elevational view of a second embodiment of the invention, shown in the retracted position in solid lines and in the extended position in broken lines.

BEST MODE FOR CARRYING OUT THE INVENTION

Figure 1:
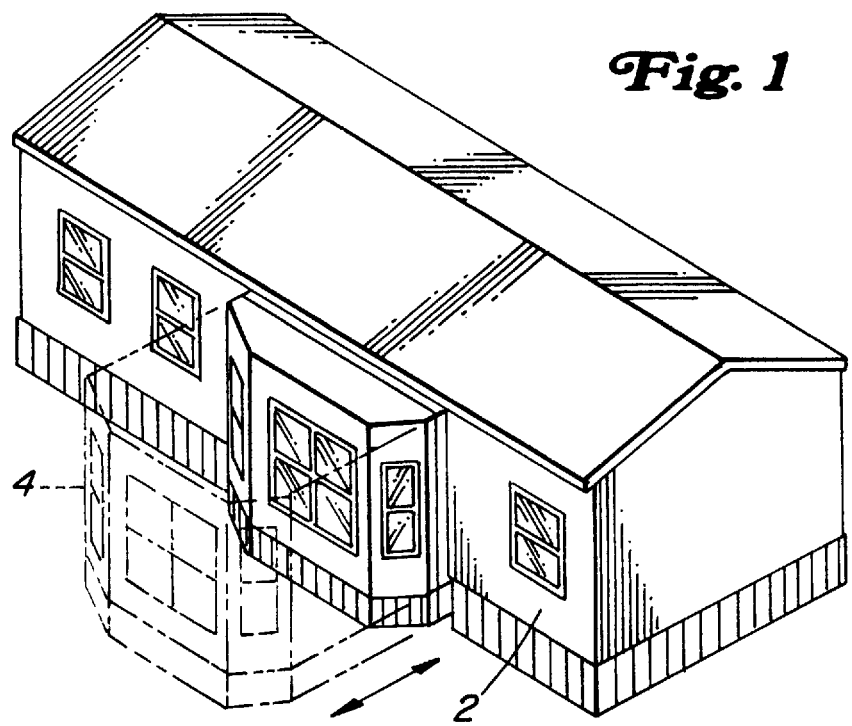
FIG. 1 is a perspective view of a mobile home having an extendable room.

Referring now to the drawings, wherein like reference numerals designate identical or corresponding parts throughout the several views, FIG. 1 depicts a mobile home 2 with an extendable living room 4 which is extended and retracted by means of the present invention.

Figure 2:
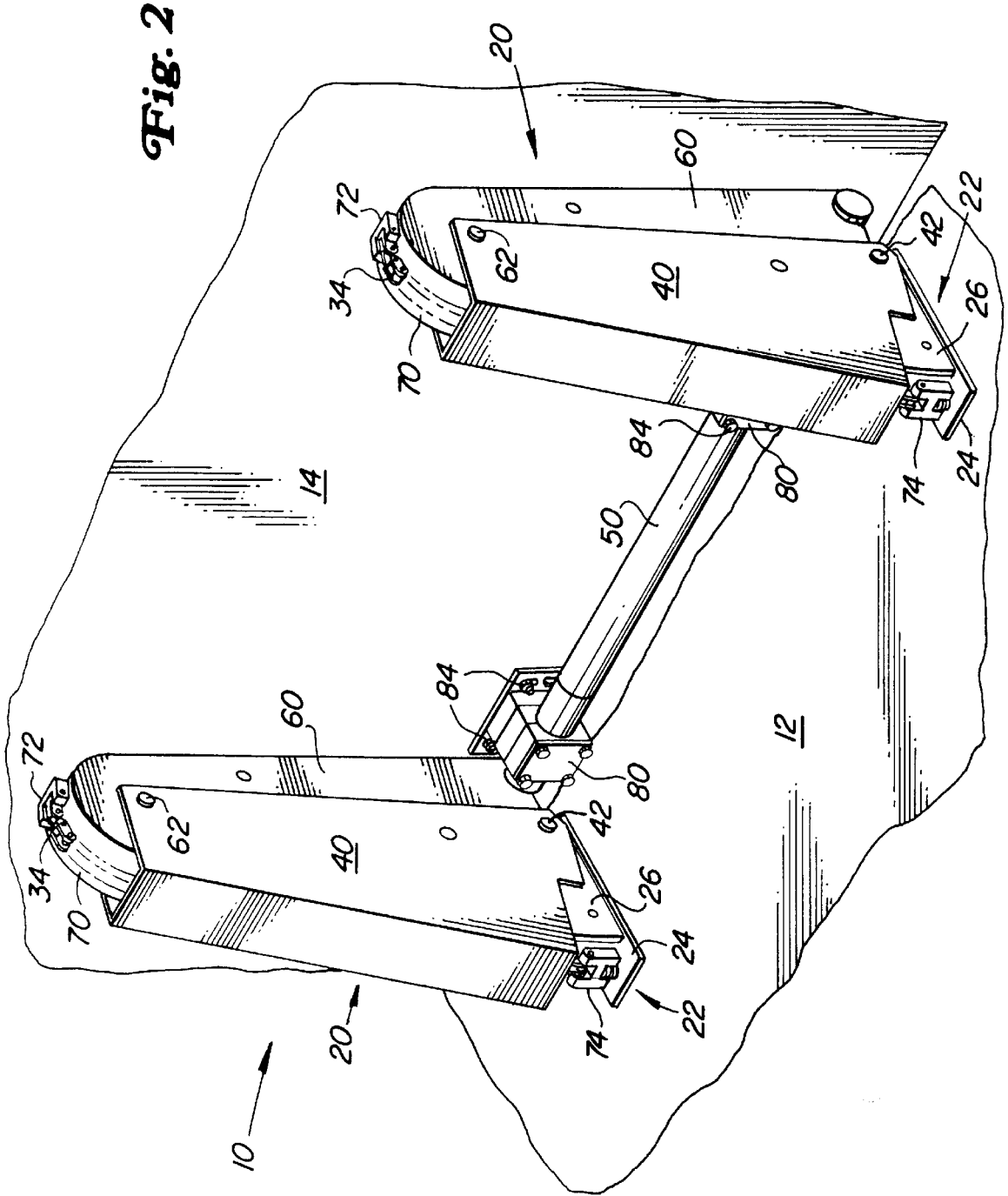
FIG. 2 is a perspective view of a first embodiment of the invention in the retracted position and secured to a floor and a wall to be moved.

A perspective view of a first embodiment of the invention is shown at 10 in FIG. 2 in the retracted position where it is secured to the floor 12 of the mobile home as well as the wall 14 of the structure to be moved. As would be apparent to those skilled in the art, the two extension mechanisms 20 would normally be adjacent opposing walls within the mobile home and would be covered, normally by paneling. The torsion bar 50 would normally be hidden by paneling or a piece of furniture such as a sofa or couch (not shown).

Figure 3:
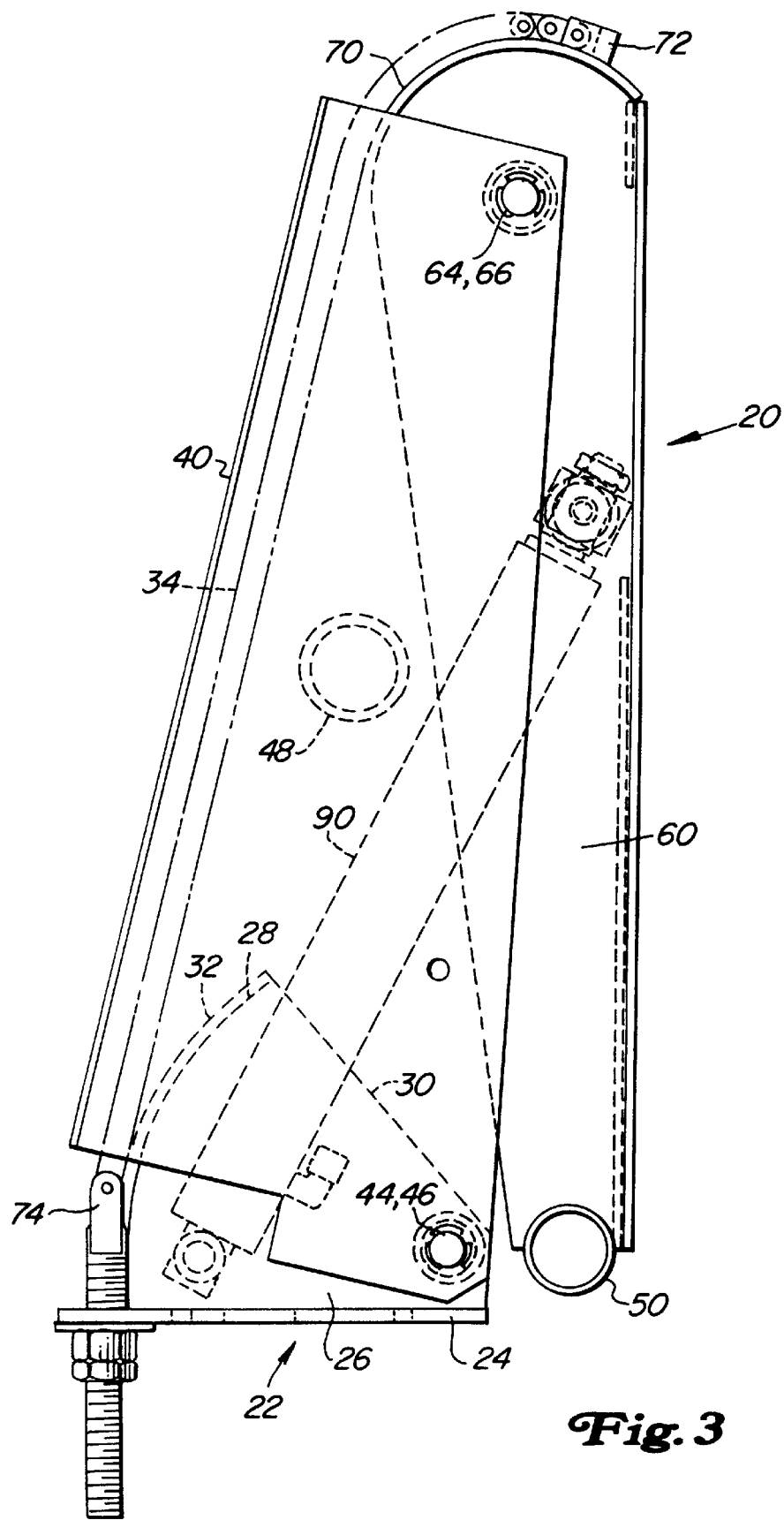
FIG. 3 is a side elevational view of the first embodiment in the retracted position.
Figure 4:
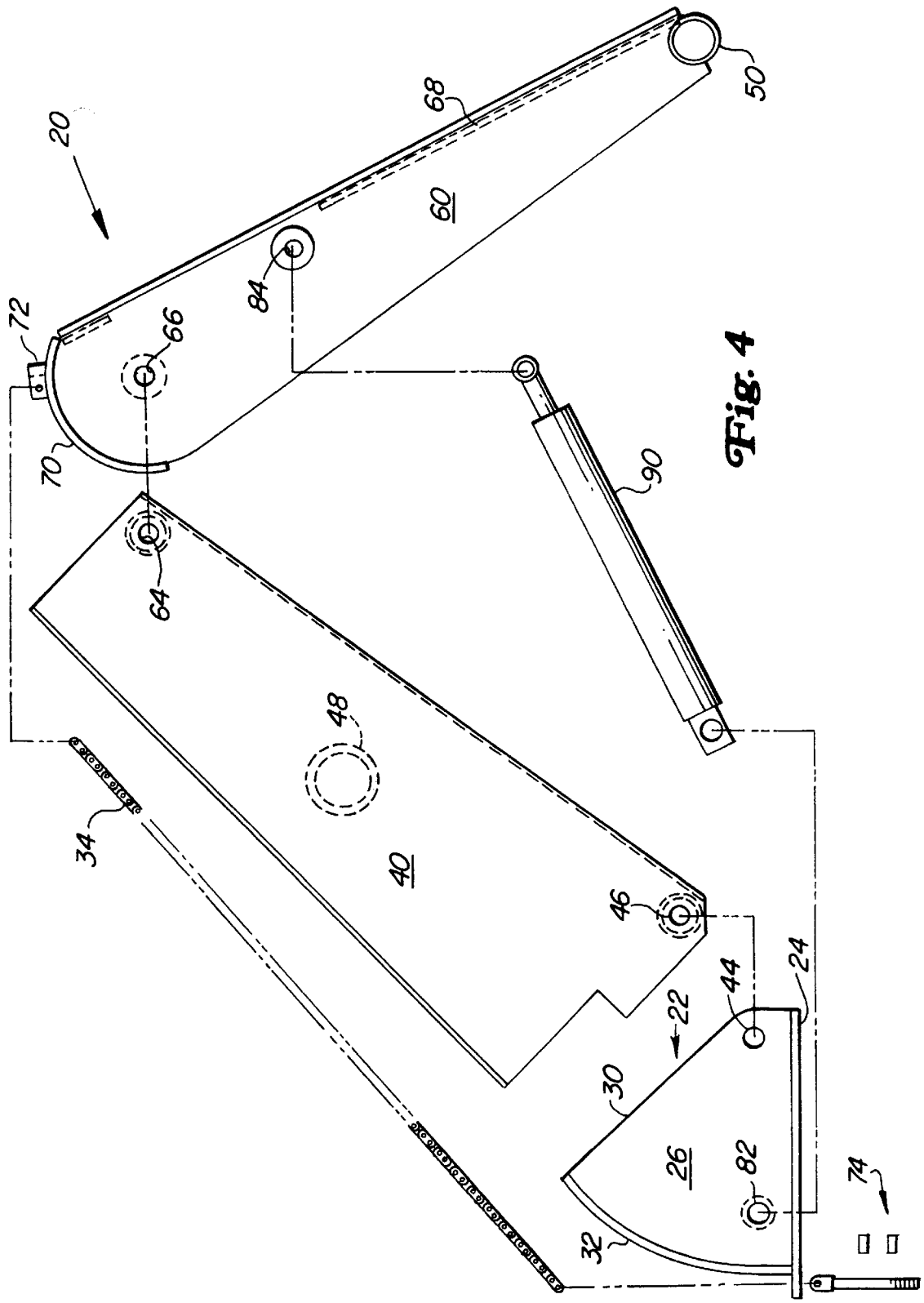
FIG. 4 is an exploded, side elevational view of the major components of the first embodiment in the extended position.

Referring now to FIGS. 2, 3, and 4, the extension mechanisms 20 are comprised of a pivot base 22, an inner pivot assembly 40, an outer pivot assembly 60, and a hydraulic cylinder 90. The pivot base 22 includes a base plate 24 to which is welded to a pair of spaced apart vertical plates 26 which have a rear, circular section 28 and a forward, angled section 30. The circular section 28 has a chain guide 32 welded thereon for carrying a flat chain 34 or other appropriate tension member as will be more fully described below.

The pivot base 22 is secured to the floor 12 by means of two bolts (not shown) extending through the flooring. The inner pivot assembly 40 is fabricated to form a U-shaped section of steel as clearly seen in FIG. 2, and is pivotally attached to the pivot base 22 by means of a pivot pin 42 extending through holes 44, 46 (FIG. 4) passing through the pivot base 22 and inner pivot assembly 40, respectively. The inner pivot assembly 40 also preferably has a central stiffener 48.

The inner pivot assembly 40 is pivotally connected to the outer pivot assembly 60 by means of a pivot pin 62 extending through pivot holes 64, 66 in the inner and outer pivot assemblies, respectively. The outer pivot assembly 60, like the inner pivot assembly 40, is fabricated to form a U-shaped section of steel, within which is carried sections of stiffener 68. The inner end of the outer pivot assembly 60 is circular in shape and carries a chain guide 70 with a chain anchor 72 affixed thereto.

The extension members 20 are each operably extended and retracted by means of a hydraulic cylinder 90 extending between the support base 22 at attachment point 82 and outer pivot assembly 60 at attachment point 84.

As most clearly depicted in FIG. 3, the chain 34 extends from the chain anchor 72, around the chain guide 70, and then extends within inner pivot assembly 40 down to chain guide 32 until it is secured by means of a chain adjustment fitting 74, which passes through the pivot base 22 and the floor 12.

A torsion bar 50 is welded to the distal ends of outer pivot assembly 60 and extends between the two extension mechanisms 20 and serves to synchronize their movement as will be further described. A pair of bearing units 80 are pivotally carried on the torsion bar 50 and are secured to the moveable wall 14 by means of screws or bolts 86.

The chains 34 and curved chain guides 32 and 70 serve to vertically position the torsion bar 50 and also to maintain the torsion bar 50 in a horizontal plane during extension and retraction. With the hydraulic cylinder 90 locked in the retracted position, loosening or tightening of chain adjustment fitting 74 will cause the entire extension mechanism 20 to pivot fore and aft about pivot point 44. This pivoting action will in turn cause the torsion bar 50 to move up or down vertically. With the invention secured to the floor 12 and wall 14 of a mobile home, this action can be used to properly position the wall 14 with respect to the floor 12.

As best seen in FIG. 3, the vertical distance between pivot holes 44, 46 and 64, 66 is equal to the vertical distance between pivot holes 64, 66 and the center of the torsion bar 50. Also, the radius of curvature of chain guide 32 is twice the radius of curvature of chain guide 70. This relationship will cause the torsion bar 50 to remain in the same horizontal plane during extension and retraction since the chain 34 will force outer pivot assembly 60 to pivot twice as fast as inner pivot assembly 40.

The torsion bar 50, secured as it is between the distal ends of the outer pivot assemblies 60, serves to synchronize the linear movement of the extension mechanisms 20 and therefore prevent twisting and binding. If, for example, during extension the right extension mechanism would begin to lead the left mechanism, the torsion bar 50 would transfer a twisting force to the lagging mechanism, helping it to catch up. Likewise of course, the twisting action would also be felt by the leading extension mechanism, and tend to slow it down.

A second embodiment of the invention is depicted in FIG. 5 which basically replaces the chain synchronization method of the first embodiment with a four-bar linkage assembly. The pivot base 120 made from U-shaped steel channel pivotally carries an inner pivot arm 130 and an outer pivot arm 140, each also fabricated from U-shaped steel channel. Inner pivot arm 130 pivots about pivot pin 132 while outer pivot arm 140 pivots about pivot pin 142. At their upper ends, the inner and outer pivot arms 130, 140 are pivotally connected to a U-shaped lever arm 150 having a pair of extended spaced apart flanges 152 and are also pivotally connected to an outer pivot assembly 160. These four components, 130, 140, 150, 160 are pivotally connected at two pivot points 154, 156. Also extending between the pivot base 120 and the lever arm 150 is a hydraulic actuator 190.

As with the previous embodiment, the distal ends of the outer pivot assembly 160 has secured thereto a torsion bar 50 which carries a pair of bearing units 80 which are secured to the wall 14 to be moved.

The geometric relationship between the pivot base 120, the pivot arms 130, 140, the lever arm 150, and the outer pivot assembly 160 maintains the torsion bar 50 in a horizontal plane during extension and retraction. The vertical position of the torsion bar 50 and attached bearings 80 can be adjusted by means of an adjusting nut 192 on the end of the piston of the hydraulic actuator 190.

While the preceding description has focused on a hydraulically actuated system, this disclosure is intended to cover pneumatic and electrical embodiments as well. A pneumatic system would function almost identically with the hydraulic system. An electrical system would utilize electrical actuators of perhaps the screw type or chain driven type.

While the invention has been described with a certain degree of particularity, it is manifest that many changes may be made in the details of construction and the arrangement of the components without departing from the spirit and scope of the disclosure. It is therefore to be understood that the invention is not limited to the embodiments set forth herein for purposes of exemplification, but is to be limited only by the scope of the appended claims, including the full range of equivalency to which each element thereof is entitled.

What is claimed is:

1. A room extension apparatus for mobile homes having a fixed structure and a structural member to be moved between a retracted position and an extended position, comprising:

(a) first and second pivot bases secured to the fixed structure;

(b) first and second inner pivot assemblies pivotally connected to said pivot bases;

(c) first and second outer pivot assemblies pivotally connected to said inner pivot assemblies and pivotally connected to said structural member to be moved;

(d) actuator means connected to said pivot bases for extending and retracting said inner and outer pivot assemblies; and (e) a torsion bar extending between said outer pivot assemblies whereby the movement of the pivot assemblies is synchronized.

2. The apparatus as recited in claim 1, further comprising means for maintaining the torsion bar in a horizontal plane during extension and retraction.

3. The apparatus of claim 2 wherein the horizontal maintaining means is a flexible tension member attached to and interconnecting the pivot base and the outer pivot assembly.

4. The apparatus of claim 3 wherein the flexible tension member is a flat link chain.

5. An apparatus for synchronizing the movement of spaced points on an extendable member with respect to spaced points on a body member, comprising:

(a) a pair of pivot bases attached at spaced locations to the body member;

(b) a pivot mechanism pivotally connected to each pivot base, each pivot mechanism including an inner pivot assembly pivotally connected to an outer pivot assembly, the outer assembly pivotally attached to corresponding spaced points on the extendable member;

(c) means for moving each pivot mechanism with respect to each pivot base; and (d) a torsion member attached to and interconnecting the outer pivot assemblies, whereby the simultaneous movement of the outer assemblies is achieved.

6. The apparatus of claim 5 further including means for controlling the extension of the outer assemblies in a substantially horizontal plane from the pivot bases.

7. The apparatus of claim 6 wherein the controlling means is a flexible tension member attached to and interconnecting the pivot base and the outer pivot assembly.

8. The apparatus of claim 7 wherein the flexible tension member is a flat link chain.

* * * * *